United States Patent
Hoefner et al.

(10) Patent No.: US 11,040,618 B2
(45) Date of Patent: Jun. 22, 2021

(54) DRIVE UNIT FOR AN ELECTRIC VEHICLE, AND MOTOR VEHICLE

(71) Applicant: Bayerische Motoren Werke Aktiengesellschaft, Munich (DE)

(72) Inventors: Benedikt Hoefner, Munich (DE); Norbert Lipot, Ismaning (DE); Lorenz Niklas, Starnberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/671,378

(22) Filed: Nov. 1, 2019

(65) Prior Publication Data
US 2020/0062129 A1 Feb. 27, 2020

Related U.S. Application Data

(63) Continuation of application No. PCT/EP2018/061257, filed on May 3, 2018.

(30) Foreign Application Priority Data

May 9, 2017 (DE) ..................... 10 2017 207 834.0

(51) Int. Cl.
*B60K 1/02* (2006.01)
*B60K 17/356* (2006.01)
(Continued)

(52) U.S. Cl.
CPC .............. *B60K 17/356* (2013.01); *B60K 1/02* (2013.01); *B60K 6/26* (2013.01); *B60K 6/28* (2013.01);
(Continued)

(58) Field of Classification Search
CPC .......... B60L 50/51; B60L 50/61; B60L 50/66; B60K 1/02; B60K 6/26; B60K 6/28; B60K 2001/0438
See application file for complete search history.

(56) References Cited

U.S. PATENT DOCUMENTS 5,988,307 A * 11/1999 Yamada ................. B60K 6/445
180/243
7,255,185 B2 * 8/2007 Shimizu ............... B60K 17/356
180/65.1
(Continued)

FOREIGN PATENT DOCUMENTS

CN 101519040 B 12/2012
DE 10 2010 017 966 A1 10/2011
(Continued)

OTHER PUBLICATIONS

International Search Report (PCT/ISA/210) issued in PCT Application No. PCT/EP2018/061257 dated Aug. 16, 2018 with English translation (five (5) pages).
(Continued)

*Primary Examiner* — Bryan A Evans
(74) *Attorney, Agent, or Firm* — Crowell & Moring LLP

(57) ABSTRACT

A drive unit for an electric vehicle includes a first electrical drive assembly which is associated with, and drive-connected to, a motor vehicle front axle, and a second electrical drive assembly which is associated with, and drive-connected to, a motor vehicle rear axle. A center of mass of the first drive assembly lies on a side of the motor vehicle front axle facing away from the motor vehicle rear axle, and a center of mass of the second drive assembly lies on a side of the motor vehicle rear axle facing away from the motor vehicle front axle. Also, a motor vehicle has such a drive unit.

19 Claims, 1 Drawing Sheet

(51) Int. Cl.
  *B60L 50/61* (2019.01)
  *B60L 50/60* (2019.01)
  *B60L 50/51* (2019.01)
  *B60K 6/26* (2007.10)
  *B60K 6/28* (2007.10)
  *B60K 1/04* (2019.01)

(52) U.S. Cl.
  CPC .............. *B60L 50/51* (2019.02); *B60L 50/61* (2019.02); *B60L 50/66* (2019.02); *B60K 2001/0438* (2013.01)

(56) References Cited

U.S. PATENT DOCUMENTS

| | | |
|---|---|---|
| 2011/0259657 A1 | 10/2011 | Fuechtner |
| 2012/0174708 A1 | 7/2012 | Nagamori et al. |
| 2017/0096062 A1* | 4/2017 | Wu ...................... B60K 7/0015 |
| 2017/0305250 A1* | 10/2017 | Hara .................... H01M 2/1083 |
| 2017/0305251 A1* | 10/2017 | Hara ........................ B60K 1/04 |

FOREIGN PATENT DOCUMENTS

| | | |
|---|---|---|
| EP | 3 020 590 A1 | 5/2016 |
| WO | WO 2015/110965 A2 | 7/2015 |
| WO | WO 2016/055873 A1 | 4/2016 |

OTHER PUBLICATIONS

German-language Written Opinion (PCT/ISA/237) issued in PCT Application No. PCT/EP2018/061257 dated Aug. 16, 2018 (three (3) pages).

German-language Search Report issued in counterpart German Application No. 10 2017 207 834.0 dated Dec. 19, 2017 with partial English translation (11 pages).

* cited by examiner

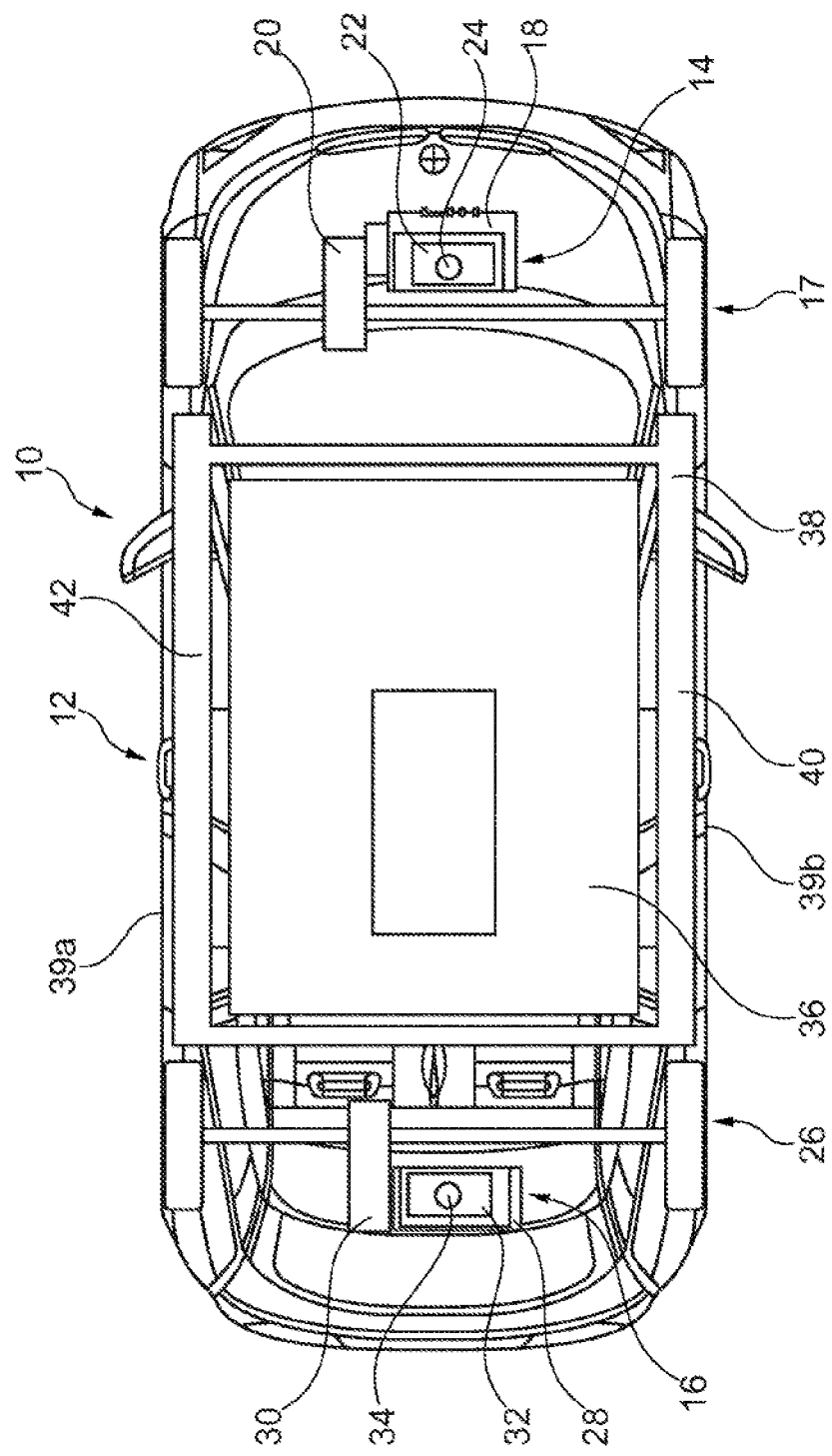

DRIVE UNIT FOR AN ELECTRIC VEHICLE, AND MOTOR VEHICLE

CROSS REFERENCE TO RELATED APPLICATIONS

This application is a continuation of PCT International Application No. PCT/EP2018/061257, filed May 3, 2018, which claims priority under 35 U.S.C. § 119 from German Patent Application No. 10 2017 207 834.0, filed May 9, 2017, the entire disclosures of which are herein expressly incorporated by reference.

BACKGROUND AND SUMMARY OF THE INVENTION

The invention relates to a drive unit for an electric vehicle, having a first electrical drive assembly, which is associated with, and drive-connected to, a motor vehicle front axle, and a second electrical drive assembly, which is associated with, and drive-connected to, a motor vehicle rear axle.

In addition, the invention relates to a motor vehicle with such a drive unit.

By an electric vehicle shall be meant here both pure electric vehicles, i.e., motor vehicles having exclusively electrical traction drives, and motor vehicles having an electrical traction drive alongside an internal combustion engine traction drive, for example. The latter motor vehicles are generally called hybrid vehicles. Thus, the term electric vehicle encompasses in particular mild, full and plug-in hybrid vehicles as well as electric vehicles with range extender.

Drive units of the abovementioned kind and corresponding motor vehicles are known in the prior art. In order to fulfill their missions, they usually comprise an electrical energy accumulator. The storage capacity thereof for electric energy is generally critical to how far a motor vehicle can travel by purely electrical operation.

It is advantageous to a motor vehicle user to have the largest possible electrical storage capacity, so that the motor vehicle does not need to be electrically recharged so often and thus longer electric ranges are achievable. However, the electric drive units and especially the electrical energy accumulators require a relatively large design space when a large electrical storage capacity is to be provided. For a given vehicle size, this design space is then no longer available as vehicle interior for the passengers. Thus, there is a conflict of purpose between a large electric range and a large vehicle interior.

In known electric vehicles, for this reason there is always a compromise choice between a large electric range and a sufficiently large vehicle interior.

The problem which the invention proposes to solve is to further improve drive units of the kind mentioned above and the associated motor vehicles. In particular, a drive unit and a motor vehicle should be created, both having a large electrical storage capacity and an ample vehicle interior for passengers.

The problem is solved by a drive unit of the kind mentioned above, wherein a center of mass of the first drive assembly lies on a side of the motor vehicle front axle facing away from the motor vehicle rear axle, and a center of mass of the second drive assembly lies on a side of the motor vehicle rear axle facing away from the motor vehicle front axle. In other words, none of the drive assemblies lies between the motor vehicle front and rear axle in terms of their centers of gravity. This distinguishes the drive unit according to the invention from known drive units in which always at least one drive assembly is situated between the motor vehicle front and rear axle. As compared to known hybrid vehicles with all-wheel drive, a central tunnel can furthermore be eliminated in a drive unit according to the invention. This results in an especially ample space between the motor vehicle front and rear axle. This space can be utilized either for an electrical energy accumulator or for the passenger compartment. A proportionate use for both purposes is also possible. Furthermore, the fully electric all-wheel drive affords the possibility of actuating the front and rear axle independently of each other according to the driving situation. The arrangement of the centers of mass according to the invention is also sensible from the standpoint of driving dynamics. Thus, a safe and at the same time dynamic driving behavior is made possible in this way.

Each of the drive assemblies may comprise an electric machine and a gear unit. Thus, one electric machine is associated with the front axle and one electric machine with the rear axle. The electric machines are thus situated close to the components to which they are supposed to transmit power. This makes the design of the drive assemblies simple and compact.

Preferably, the electric machine of the first drive assembly is drive-coupled to the motor vehicle front axle across the gear unit of the first drive assembly and/or the electric machine of the second drive assembly is drive-coupled to the motor vehicle rear axle across the gear unit of the second drive assembly. Each motor vehicle axle is thus coupled only with one of the electric machines. Thus, the motor vehicle front axle and rear axle can be operated independently of each other. The drive unit may thus be used as a front axle drive, a rear axle drive, and an all-wheel drive. Mixed forms of any given kind are also possible. The drive unit can be easily adapted to different driving situations and thus enables an optimization in regard to the energy operating strategy.

According to one embodiment, the electric machine of the first drive assembly and/or the electric machine of the second drive assembly is a permanent magnet-excited synchronous machine, a current-excited synchronous machine, or an induction machine. The permanent magnet-excited synchronous machine is often abbreviated as PSM, the current-excited synchronous machine as SSM, and the induction machine as ASM. Such machines are common and well proven in the field of electric vehicle drives. The SSM has the advantage that little or no magnetic material is required for such an electric machine. Thus, the manufacture of an SSM is basically independent of raw material prices for magnetic materials.

In one modification, the drive assemblies comprise a respective inverter unit. Each electric machine can work as an electric motor and as an electric generator. If the electric machines of the drive assemblies are operating as electric motors, they thus drive an associated electric vehicle, and so the inverter unit is used to convert the direct current provided by an electrical energy accumulator into a three-phase alternating voltage for the operation of the electric motors. If the electric machines are being used as electric generators, the inverter unit converts the generated three-phase alternating current into a direct current with which the electrical energy accumulator is charged. The generator mode is utilized, for example, in the course of a recuperation during the braking of an electric vehicle.

According to one variant configuration, the first drive assembly and the second drive assembly are drive-decoupled. The motor vehicle front and rear axle may thus be actuated independently of each other according to the driving situation. This achieves an especially safe traction and driving behavior.

The first drive assembly and the second drive assembly may be torque-adjustable independently of each other. Thus, the drive assemblies work as electrical torque adjusters. Therefore, the precisely required torque may be provided on each motor vehicle axle. An electric all-wheel drive is thus provided, ensuring a safe operation of the electric vehicle in every driving situation.

Advantageously, the drive unit comprises an electrical energy accumulator, which is arranged between the motor vehicle front axle and the motor vehicle rear axle. The drive assemblies are supplied with electric energy by the electrical energy accumulator. Thanks to its arrangement between the two motor vehicle axles, it is situated close to the drive assemblies, so that the electric energy only has to be conducted over short distances. This makes the design of the drive unit overall compact.

In one variant, the drive unit comprises an electrical energy accumulator which is held in the electric vehicle by means of a support frame, the support frame basically forming a side edge of the motor vehicle. Thus, an especially ample design space is made available for the support frame and thus for the electrical energy accumulator, so that the electrical energy accumulator can be designed with an especially large storage capacity. Since normally the region of a side edge of the motor vehicle is not utilized for the passenger compartment, the large energy storage capacity does not come at the cost of the space available for the passengers. Accordingly, the aforementioned conflicting purposes can be avoided.

The support frame may be formed at least for a portion by chassis components. Thus, the support frame is configured as part of the chassis and in this way contributes to the chassis stability. Thus, at the same time, a larger design space may be provided for the electrical energy accumulator. In this way, an especially large storage capacity may be assured for the electrical energy accumulator, without restricting the space for the passengers.

In addition, the problem is solved by a motor vehicle, especially a pure electric vehicle, with a drive unit according to the invention. The drive unit may be integrated into a floor group of the motor vehicle. Thus, a motor vehicle is created having both a large space for the passengers and the necessary design space for an especially voluminous electrical energy accumulator. Such an energy accumulator usually has a large electrical storage capacity and thus enables a large electrical range of an electric vehicle.

Other objects, advantages and novel features of the present invention will become apparent from the following detailed description of one or more preferred embodiments when considered in conjunction with the accompanying drawing.

The invention shall be explained in the following with the aid of an exemplary embodiment, which is shown in the accompanying drawing. There is shown:

BRIEF DESCRIPTION OF THE DRAWING

FIG. 1 illustrates a motor vehicle according to the invention with a drive unit according to the invention.

DETAILED DESCRIPTION OF THE DRAWING

The single FIGURE shows a motor vehicle 10 which in the embodiment depicted is a pure electric vehicle.

The motor vehicle 10 comprises a drive unit 12 having a first electrical drive assembly 14 and a second electrical drive assembly 16.

The first electrical drive assembly 14 is associated with a motor vehicle front axle 17 and comprises an electric machine 18, a gear unit 20 and an inverter unit 22.

A center of mass 24 of the first electrical drive assembly 14 lies on a side of the motor vehicle front axle 17 facing away from the motor vehicle rear axle 26.

The second electrical drive assembly 16 is associated with a motor vehicle rear axle 26. This comprises an electric machine 28, a gear unit 30 and an inverter unit 32.

A center of mass 34 of the second drive assembly 16 lies on a side of the motor vehicle rear axle 26 facing away from the motor vehicle front axle 17.

In other words, the center of mass 34 of the second electrical drive assembly 16 lies behind the motor vehicle rear axle 26 and the center of mass 24 of the first electrical drive assembly 14 lies in front of the motor vehicle front axle 17.

The first electrical drive assembly 14 is drive-connected to the motor vehicle front axle 17 and the second electrical drive assembly 16 is drive-connected to the motor vehicle rear axle 26.

For this, the electric machine 18 is drive-coupled to the motor vehicle front axle 17 across the gear unit 20 and the electric machine 28 is drive-coupled to the motor vehicle rear axle 26 across the gear unit 30.

Thus, the first electrical drive assembly 14 is not coupled to the second electrical drive assembly 16. The drive assemblies 14, 16 are thus drive-decoupled.

The two drive assemblies 14, 16 are torque-adjustable independently of each other.

The electric machines 18, 28 may be permanent magnet-excited synchronous machines, current-excited synchronous machines or induction machines. A combination of the mentioned types is also possible, so that, for example, the electric machine 18 is a permanent magnet-excited synchronous machine and the electric machine 28 is a current-excited synchronous machine.

The drive unit 12 furthermore comprises an electrical energy accumulator 36, which is arranged between the motor vehicle front axle 17 and the motor vehicle rear axle 26.

The energy accumulator 36 works together with both the electric machine 18 and the electric machine 28.

If the electric machines 18, 28 are operating as electric motors, the energy accumulator 36 provides a direct current, which is converted by the inverter units 22, 32 into a three-phase alternating current. This is used to supply the electric machines 18, 28 and drive the motor vehicle front axle 17 and the motor vehicle rear axle 26.

In a generator mode, the electric machines 18, 28 work as generators. This may occur, for example, in the course of a recuperation during the braking of the motor vehicle 10.

The electric machines 18, 28 then provide a 3-phase alternating current, which is converted by the associated inverter units 22, 32 into a direct current. This direct current can charge the energy accumulator 36.

From a mechanical perspective, the energy accumulator 36 is held in the motor vehicle 10 by means of a support frame 38.

The support frame 38 is basically a side edge 39a, 39b of the motor vehicle.

Furthermore, the support frame 38 is formed at least for a portion by chassis components. In the embodiment shown, for example, the frame components 40, 42 are longitudinal beams of the chassis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive unit for an electric vehicle, comprising:
   a first electrical drive assembly, which is associated with, and drive-connected to, a motor vehicle front axle;
   a second electrical drive assembly, which is associated with, and drive-connected to, a motor vehicle rear axle; and
   an electrical energy accumulator which is held in the electric vehicle by a support frame, the support frame surrounding the electrical energy accumulator on four sides thereof and forming a side edge of the motor vehicle;
   wherein a center of mass of the first drive assembly lies on a side of the motor vehicle front axle facing away from the motor vehicle rear axle, and a center of mass of the second drive assembly lies on a side of the motor vehicle rear axle facing away from the motor vehicle front axle.

2. The drive unit according to claim 1, wherein each of the first and second drive assemblies comprises an electric machine and a gear unit.

3. The drive unit according to claim 2, wherein the electric machine of the first drive assembly is drive-coupled to the motor vehicle front axle across the gear unit of the first drive assembly and/or the electric machine of the second drive assembly is drive-coupled to the motor vehicle rear axle across the gear unit of the second drive assembly.

4. The drive unit according to claim 2, wherein the electric machine of the first drive assembly and/or the electric machine of the second drive assembly is a permanent magnet-excited synchronous machine, a current-excited synchronous machine, or an induction machine.

5. The drive unit according to claim 1, wherein the first and second drive assemblies comprise a respective inverter unit.

6. The drive unit according to claim 1, wherein the first drive assembly and the second drive assembly are drive-decoupled.

7. The drive unit according to claim 1, wherein the first drive assembly and the second drive assembly are torque-adjustable independently of each other.

8. The drive unit according to claim 1, further comprising an electrical energy accumulator, which is arranged between the motor vehicle front axle and the motor vehicle rear axle.

9. The drive unit according to claim 1, wherein the support frame is formed at least for a portion by chassis components.

10. The drive unit according to claim 3, wherein the electric machine of the first drive assembly and/or the electric machine of the second drive assembly is a permanent magnet-excited synchronous machine, a current-excited synchronous machine, or an induction machine.

11. The drive unit according to claim 2, wherein the first and second drive assemblies comprise a respective inverter unit.

12. The drive unit according to claim 2, wherein the first drive assembly and the second drive assembly are drive-decoupled.

13. The drive unit according to claim 3, wherein the first drive assembly and the second drive assembly are drive-decoupled.

14. The drive unit according to claim 2, wherein the first drive assembly and the second drive assembly are torque-adjustable independently of each other.

15. The drive unit according to claim 3, wherein the first drive assembly and the second drive assembly are torque-adjustable independently of each other.

16. The drive unit according to claim 2, further comprising an electrical energy accumulator, which is arranged between the motor vehicle front axle and the motor vehicle rear axle.

17. The drive unit according to claim 3, further comprising an electrical energy accumulator, which is arranged between the motor vehicle front axle and the motor vehicle rear axle.

18. The drive unit according to claim 2, further comprising an electrical energy accumulator which is held in the electric vehicle by a support frame, the support frame forming a side edge of the motor vehicle.

19. A motor vehicle having a drive unit according to claim 1.

* * * * *